(12) United States Patent
Huang

(10) Patent No.: US 11,970,354 B2
(45) Date of Patent: Apr. 30, 2024

(54) DEVICE AND METHOD FOR SEPARATING OPTICAL ADHERED FILMS

(71) Applicant: HKC CORPORATION LIMITED, Shenzhen (CN)

(72) Inventor: Beizhou Huang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 560 days.

(21) Appl. No.: 17/270,870

(22) PCT Filed: Dec. 18, 2018

(86) PCT No.: PCT/CN2018/121718
§ 371 (c)(1),
(2) Date: Feb. 24, 2021

(87) PCT Pub. No.: WO2020/052139
PCT Pub. Date: Mar. 19, 2020

(65) Prior Publication Data
US 2021/0179371 A1   Jun. 17, 2021

(30) Foreign Application Priority Data

Sep. 11, 2018 (CN) .......................... 201821487178.3

(51) Int. Cl.
*B65H 3/08* (2006.01)
*B32B 38/10* (2006.01)
(Continued)

(52) U.S. Cl.
CPC ........... *B65H 3/0808* (2013.01); *B32B 38/10* (2013.01); *B32B 43/006* (2013.01); *B65H 3/46* (2013.01)

(58) Field of Classification Search
CPC ........ B65H 3/0808; B65H 3/46; B32B 38/10; B32B 43/00
See application file for complete search history.

(56) References Cited

U.S. PATENT DOCUMENTS

2016/0159068 A1* 6/2016 Yan .......................... B65H 41/00
156/759

FOREIGN PATENT DOCUMENTS

| CN | 101830356 A | 9/2010 |
| CN | 103167742 A | 6/2013 |

(Continued)

OTHER PUBLICATIONS

Translation of CN 101830356 A, Sep. 15, 2010, Chroma Ate Shenzen Inc, Lin, Han-sheng (Year: 2010).*
(Continued)

*Primary Examiner* — George R Koch

(57) ABSTRACT

This application discloses a device and a method for separating optical adhered films. The device for separating optical adhered films includes: a separating workbench configured to separate optical films; a suction nozzle configured to adsorb the optical film; a driving device configured to drive the suction nozzle and the separating workbench. The suction nozzle includes a first group of suction nozzles and a second group of suction nozzles. The first group of suction nozzles and the second group of suction nozzles are arranged opposite to each other. The method for separating optical adhered films includes the following steps: separating, when the detection structure for two optical adhered films detect that at least two optical films are adhered to each other, the optical adhered films by using a first group of suction nozzles and a second group of suction nozzles.

18 Claims, 4 Drawing Sheets

(51) Int. Cl.
 B32B 43/00 (2006.01)
 B65H 3/46 (2006.01)

(56) References Cited

FOREIGN PATENT DOCUMENTS

| | | |
|---|---|---|
| CN | 103223765 A | 7/2013 |
| CN | 106773159 A | 5/2017 |
| CN | 206494843 U | 9/2017 |
| JP | 2004175541 A | 6/2004 |
| JP | 2012001291 A * | 1/2012 |

OTHER PUBLICATIONS

Translation of JP 2012001291 A, Jan. 2012, Arikawa K (Year: 2012).*
Suning Li, the ISA written comments, May 2019, CN.
Suning Li, the International Search Report, May 2019, CN.

* cited by examiner

DEVICE AND METHOD FOR SEPARATING OPTICAL ADHERED FILMS

CROSS REFERENCE OF RELATED APPLICATIONS

This application claims the priority to Chinese patent application No. 201821487178.3, filed with the National Intellectual Property Administration, PRC on Sep. 11, 2018 entitled "DEVICE FOR SEPARATING OPTICAL ADHERED FILMS", which is incorporated herein by reference in its entirety. This application is a 371 of PCT/CN2018/121718, Filing Date Dec. 18, 2018.

TECHNICAL FIELD

This application relates to the field of display technology, and in particular, to a device and a method for separating optical adhered films.

BACKGROUND

The statements herein only provide background information related to this application, and do not necessarily constitute the prior art.

A display is usually also called a monitor. The display is an input and output apparatus belonging to a computer or a TV. The display is a display tool that displays a certain electronic file on a screen through a specific transmission apparatus and then reflects the certain electronic file to a human eye. Now a main liquid crystal display and an organic light-emitting diode display are used as examples. The liquid crystal display has a plurality of advantages, such as a thin body, electricity saving, and no radiation, and therefore is widely used. Most of the liquid crystal displays in the current market are backlit liquid crystal displays, which include a liquid crystal panel and a backlight module. A working principle of the liquid crystal panel is to place liquid crystal molecules between two parallel glass substrates, and apply a driving voltage on the two glass substrates to control a rotation direction of the liquid crystal molecules, to refract light from the backlight module to produce images. An organic light-emitting diode (OLED) display, also known as an organic electroluminescent display, has many advantages such as self-luminescence, short response time, high definition and contrast, flexible display, and large-area full-color display. A superior performance and huge market potential of the organic light-emitting diode attract numerous manufacturers and scientific research institutions around the world to invest in production and research and development of the OLED display panel.

As one of important elements of displays, there is an increasingly expanding market for the optical film along with the rapid development of the displays. In production of the optical film, according to different use requirements, a certain thickness of pressure-sensitive adhesive needs to be coated on one side of a raw sheet of the optical film, and an isolation film that protects the pressure-sensitive adhesive is composited. On the other side, a protective film, a reflective film, and a semi-transparent and semi-reverse adhesive layer film are respectively composited according to a product type to form a finished optical film.

However, during production, two or more optical films may be adhered together and are not separated.

SUMMARY

This application provides a device and a method for separating optical adhered films that may cause the optical adhered films to be completely separated from each other.

In order to achieve the objective, this application provides a device for separating optical adhered films. The device includes: a separating workbench configured to separate optical films; a suction nozzle configured to adsorb the optical film; and a driving device configured to drive the suction nozzle and the separating workbench; The suction nozzle includes a first group of suction nozzles and a second group of suction nozzles. The first group of suction nozzles and the second group of suction nozzles are arranged opposite to each other.

Optionally, the separating workbench includes a fixed table and a base. The fixed table is fixedly arranged on the base, the first group of suction nozzles is arranged on the driving device, and the second group of suction nozzles is arranged on the fixed table.

Optionally, the separating workbench further includes: a first clamping piece and a second clamping piece. One end of the first clamping piece is connected to the first group of suction nozzles, and the other end thereof is connected to the driving device. One end of the second clamping piece is connected to the second group of suction nozzles, and the other end thereof the clamping piece is connected to the fixed table; The first clamping piece and the second clamping piece are arranged in parallel. The first group of suction nozzles protrudes from a working surface of the first clamping piece. The second group of suction nozzles protrudes from a working surface of the second clamping piece.

Optionally, the suction nozzle includes a clamping piece end. The clamping piece end is embedded in a fixing end of the suction nozzle and the clamping piece end is connected to the first clamping piece or the second clamping piece.

Optionally, the driving device includes a driving sub-device configured to drive the separating workbench to move along a direction. The separating workbench is arranged on the driving sub-device.

Optionally, the separating device includes a detection structure for two optical adhered films configured to detect a number of optical films, where the detection structure for two optical adhered films is connected to the separating workbench.

This application further discloses a method for separating optical adhered films. The method includes the following steps:

separating, when the detection structure for two optical adhered films detect that at least two optical films are adhered to each other, the optical adhered films by using a first group of suction nozzles and a second group of suction nozzles.

Optionally, the using the separating workbench to separate the optical adhered films includes:

if the optical adhered films are successfully separated and a pressure of the suction nozzle is detected to be normal, detecting a number of the optical films again; and if there are no optical films adhered to each other, retracting by the detection structure for two optical adhered films and the separating workbench; and sending the optical films out.

Optionally, the using the separating workbench to separate the optical adhered films includes:

if the optical adhered films are unsuccessfully separated or a pressure of the suction nozzle is detected to be abnormal; and reporting, by a system, an error, and submitting the error for manual confirmation and processing.

In the device for separating optical adhered films of this application, because the first group of suction nozzles and the second group of suction nozzles are arranged opposite to each other, the first group of suction nozzles and the second group of suction nozzles are respectively adsorbed on an upper surface and a lower surface of the optical adhered film, and then the first group of suction nozzles and the second group of suction nozzles are driven by the driving device to pull the optical adhered films toward both sides, so that the optical adhered films are slowly separated from each other, until the optical adhered films are pulled to be completely separated from each other. Therefore, the optical adhered films may be completely separated from each other.

BRIEF DESCRIPTION OF DRAWINGS

The included accompanying drawings are used to provide further understanding of the embodiments of this application, constitute a part of the specification, and are used to illustrate implementations of this application and explain the principle of this application together with literal descriptions. Obviously, the accompanying drawings in the following descriptions are merely some embodiments of this application, and a person of ordinary skill in the art may further obtain other accompanying drawings according to the accompanying drawings without creative efforts. In the accompanying drawings.

DETAILED DESCRIPTION OF EMBODIMENTS

Figure 1:
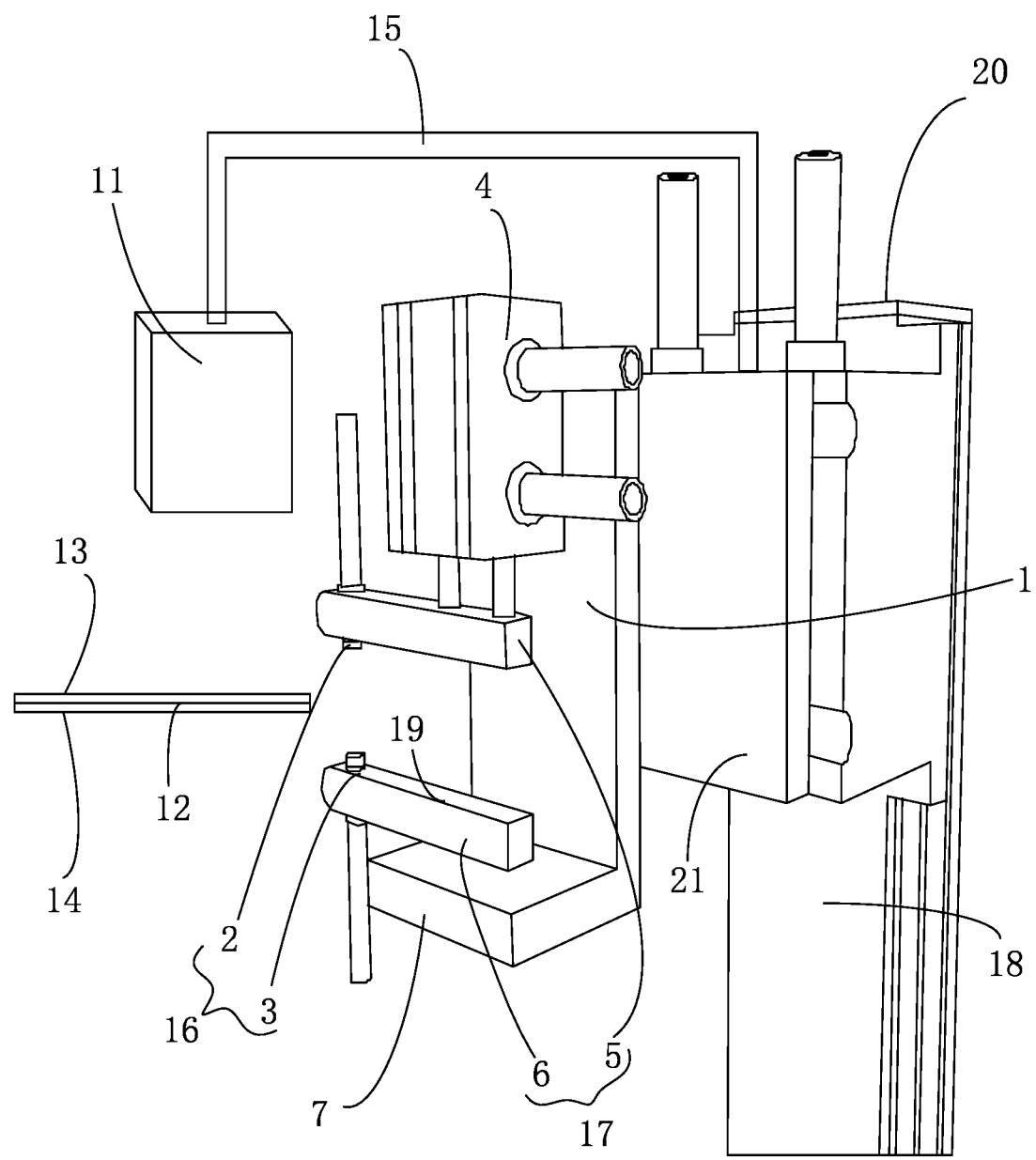
FIG. 1 is a schematic diagram of an overall structure according to an embodiment of this application.

Specific structures and functional details disclosed herein are merely representative, and are intended to describe the objectives of the exemplary embodiments of this application. However, this application may be specifically implemented in many alternative forms, and should not be construed as being limited to the embodiments set forth herein.

In the description of this application, it should be understood that orientation or position relationships indicated by the terms such as "center", "transverse", "on", "below", "left", "right", "vertical", "horizontal", "top", "bottom", "inside", and "outside" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of this application. In addition, terms "first" and "second" are used merely for the purpose of description, and shall not be construed as indicating or implying relative importance or implying a quantity of indicated technical features. Therefore, a feature limited by "first" or "second" may explicitly or implicitly include one or more of the features. In the description of this application, "multiple" means two or more than two, unless otherwise specified. In addition, the terms "include", "comprise" and any variant thereof are intended to cover non-exclusive inclusion.

In the description of this application, it should be noted that, unless otherwise specified or defined, the terms such as "mount", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. Persons of ordinary skill in the art may understand the specific meanings of the foregoing terms in this application according to specific situations.

The terminology used herein is for the purpose of describing specific embodiments only and is not intended to be limiting of exemplary embodiments. As used herein, the singular forms "a", "an" and "the" are intended to include the plural forms as well, unless the context clearly indicates otherwise. It should be further understood that the terms "include" and/or "comprise" when used in this specification, specify the presence of stated features, integers, steps, operations, elements, and/or components, but do not preclude the presence or addition of one or more other features, integers, steps, operations, elements, components, and/or combinations thereof.

An applicant currently has several methods for separating optical adhered films. In a first method, software control is used, a function of taking out or taking out and shaking a film or a plurality of films is added; and the optical film is shaken off. In a second method, a duckbill-type side blowing device is added on a long side and a short side of a collet of the optical film; and the optical film is separated through airflow. In combination with the second method, the software controls the side blowing to be always implemented after the optical film is taken out and to be stopped until a next film is taken out. In another method, a jig with paddles is added and used to separate the adhered films. However, all of the foregoing methods do not ensure an ideal effect of separating the optical adhered films, and there is always a non-separated optical film group flowing into a production line, causing poor quality.

This application will be further described below with reference to the accompanying drawings and preferred embodiments.

Figure 2:
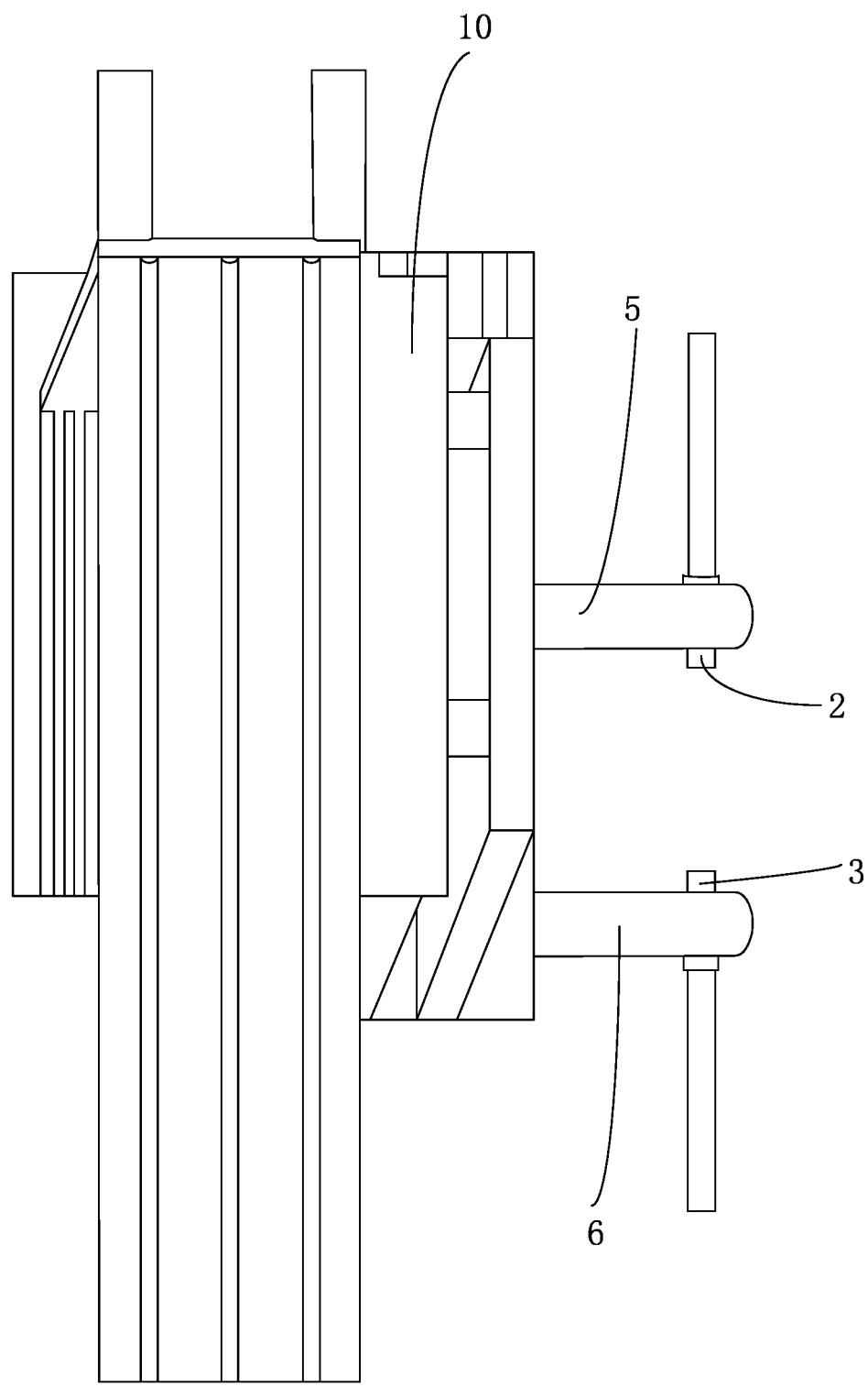
FIG. 2 is a schematic diagram of matching of a suction nozzle with a clamping piece according to an embodiment of this application.
Figure 3:
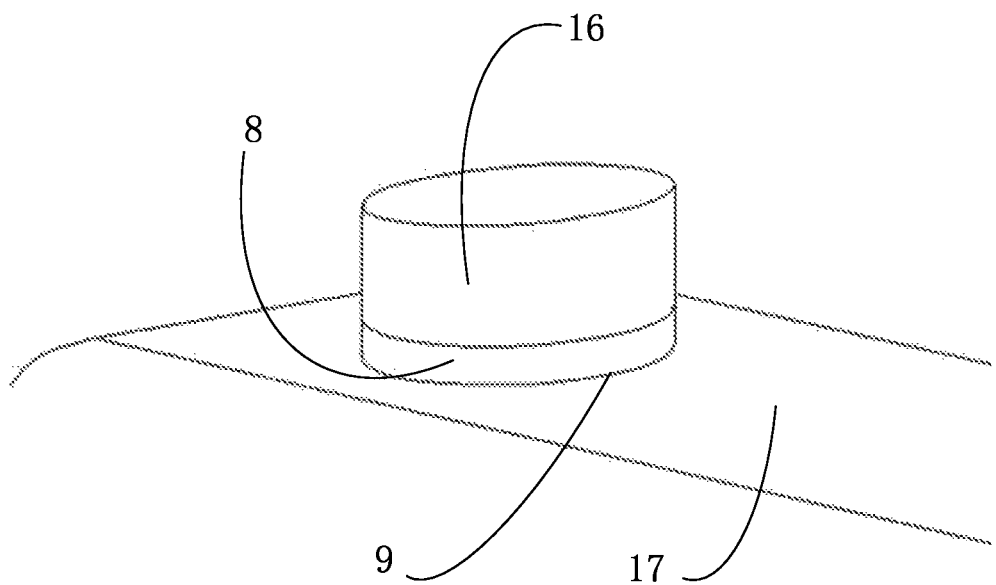
FIG. 3 is a schematic diagram of a driving sub-device according to an embodiment of this application.

As shown in FIG. 1 to FIG. 3, in one or more embodiments of this application discloses a device for separating optical adhered films. The device includes: a separating workbench 1 configured to separate the optical film; a suction nozzle 16 configured to adsorb the optical film; and a driving device 4 configured to drive the suction nozzle and the separating workbench. The suction nozzle includes a first group of suction nozzles 2 and a second group of suction nozzles 3. The first group of suction nozzles 2 and the second group of suction nozzles 3 are arranged opposite to each other. The separating workbench includes a fixed table 7 and a base 21. The fixed table 7 is fixedly arranged on the base 21. The first group of suction nozzles 2 is arranged on the driving device, and the second group of suction nozzles 3 is arranged on the fixed table 7. The separating workbench 1 includes: a first clamping piece 5 and a second clamping piece 6. One end of the first clamping piece is connected to the first group of suction nozzles 2, and the other end of the clamping piece is connected to the driving device 4. One end of the second clamping piece is connected to the second group of suction nozzles 3, and the other end of the clamping piece is connected to the fixed table 7. The first clamping piece 5 and the second clamping piece 6 are arranged in parallel. The suction nozzle 16 protrudes from a clamping piece working surface 19 of the first clamping piece 5 and the second clamping piece 6. The suction nozzle 16 includes a clamping piece end 8. The clamping piece end 8 is embedded in a fixing end 9 of the suction nozzle, and the clamping piece end 8 is connected to a clamping piece 17. The driving device 4 includes a driving sub-device 10. The driving sub-device is configured to drive the separating workbench to move along one direction, and the separating workbench 1 is arranged on the driving sub-device 10. The separating device 20 includes a detection structure 11 for two optical adhered films. The detection structure 11 for two optical adhered films is connected to the separating workbench 1.

In one or more embodiments of this application, referring to FIG. 1 to FIG. 2, a device 20 for separating optical adhered films is disclosed. The device includes: a separating workbench 1. The separating workbench 1 includes: a suction nozzle 16 configured to adsorb the optical film; and a driving device 4 configured to drive the suction nozzle 16 and the separating workbench 1. The suction nozzle 16 includes a first group of suction nozzles 2 and a second group of suction nozzles 3. The first group of suction nozzles 2 and the second group of suction nozzles 3 are arranged opposite to each other. The suction nozzle adsorbs the optical adhered films by vacuumizing; The driving device is a pneumatic driving device. The separating workbench 1 is arranged on a machine body 18. In the device 20 for separating optical adhered films 12, because the first group of suction nozzles 2 and the second group of suction nozzles 3 are arranged opposite to each other, the first group of suction nozzles and the second group of suction nozzles are respectively adsorbed on an upper surface 13 and a lower surface 14 of the optical adhered film 12, and then the first group of suction nozzles 2 and the second group of suction nozzles 3 are driven by the driving device 4 to pull the optical adhered films 12 toward both sides, so that the optical adhered films 12 are slowly separated from each other, until the optical adhered films 12 are pulled to be separated from each other completely. Therefore, the optical adhered films may be completely separated from each other.

In one or more embodiments, the separating workbench 1 includes a fixed table 7. The fixed table 7 is fixedly arranged on the separating workbench 1 and the fixed table 7 is L-shaped. The first group of suction nozzles 2 is arranged on the driving device 4, and the second group of suction nozzles 3 is arranged on the fixed table 7. A material of the separating workbench is aluminum; The second group of suction nozzles 3 is fixed and the first group of suction nozzles 2 is used as a power end. The first group of suction nozzles 2 is configured to pull and separate the optical adhered films 12, to save resources required for the second group of suction nozzles 3.

In one or more embodiments, the separating workbench 1 includes: a first clamping piece 5 and a second clamping piece 6. One end of the first clamping piece is connected to the first group of suction nozzles 2, and the other end of the clamping piece is connected to the driving device 4. One end of the second clamping piece is connected to the second group of suction nozzles 3, and the other end of the clamping piece is connected to the fixed table 7. The first clamping piece 5 and the second clamping piece 6 are arranged in parallel. The first group of suction nozzles 2 protrudes from the first clamping piece 5. The second group of suction nozzles 3 protrudes from a clamping piece working surface 19 of the second clamping piece 6. The first clamping piece and the second clamping piece are arranged horizontally, the first group of suction nozzles and second group of suction nozzles each have one nozzle, wherein the two nozzles are respectively arranged on the first clamping piece and the second clamping piece and are arranged opposite to each other, openings of the two suction nozzles being located between the first clamping piece and the second clamping piece, a shape of the suction nozzle is a circle, and centers of circles of the two suction nozzles are located on a same vertical line. When the optical adhered film 12 is clamped, the first clamping piece 5 and the second clamping piece 6 may cause the suction nozzle 2 to protrude for a certain distance in a moving direction, to shorten a distance by which the separating workbench 1 needs to move and save energy sources.

In one or more embodiments, the driving device 4 includes a driving sub-device 10. The driving sub-device is configured to drive the separating workbench 1 to move along one direction, and the separating workbench 1 is arranged on the driving sub-device 10. When the optical adhered film 12 is detected, the separating workbench 1 may move along a direction through a driving sub-device 10, and may automatically extend to clamp the optical adhered films 12 to send the optical adhered films to be separated from each other, reducing the time required for manual operation.

In one or more embodiments, the separating device 20 includes a detection structure 11 for two optical adhered films. The detection structure 11 for two optical adhered films is connected to the separating workbench 1. The detection structure 11 for two optical adhered films is directly connected to the separating workbench 1. The two detection structure can detect the optical film, and can send, through a detection signal transmission line 15, a command when detecting an optical adhered film, to improve production efficiency.

In one or more embodiments, both the first group of suction nozzles 2 and the second group of suction nozzles 3 are arranged on the driving device 4. Both ends of the nozzles pull the optical adhered film to cause a force to the optical adhered film to be more uniform.

In one or more embodiments, referring to FIG. 3, the suction nozzle 16 is directly embedded at one end of a clamping piece 17. As an alternative fixing method of the suction nozzle 16, the suction nozzle 16 includes a clamping piece end 8. The clamping piece end 8 is embedded in the fixing end 9 of the suction nozzle, and the clamping piece end 8 is connected to the clamping piece 17. The suction nozzle 16 is directly embedded at one end of the clamping piece 17, without adding other structures, so that the structure is simple. Alternatively, one clamping piece end 8 is directly embedded in the suction nozzle 16. The suction nozzle 16 is connected to the clamping piece 17 by using the clamping piece end 8, to cause the connection to be firmer.

Figure 4:
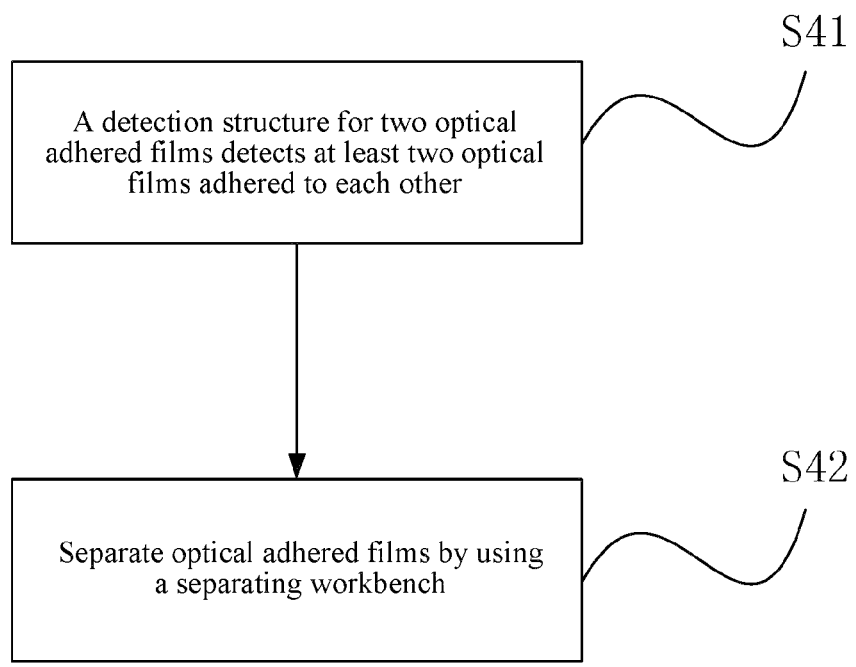
FIG. 4 is a schematic diagram of a flow of separating optical adhered films according to an embodiment of this application.

In one or more embodiments of this application, referring to FIG. 4, a method for separating optical adhered films is disclosed. The method includes the following steps:

S41: Detecting, by a detection structure 11 for two optical adhered films, that at least two optical films are adhered to each other; and S42: Separating optical adhered films by using a separating workbench 1.

In this implementation, it may be prevented that a single optical film is transported for separation, causing blocking of production and affecting production efficiency.

In one or more embodiments, the separating the optical adhered films by using a separating workbench 1 includes:

when the optical adhered films 12 are separated from each other successfully and a pressure of the suction nozzle 16 is detected to be normal, detecting a number of the optical films again.

Figure 5:
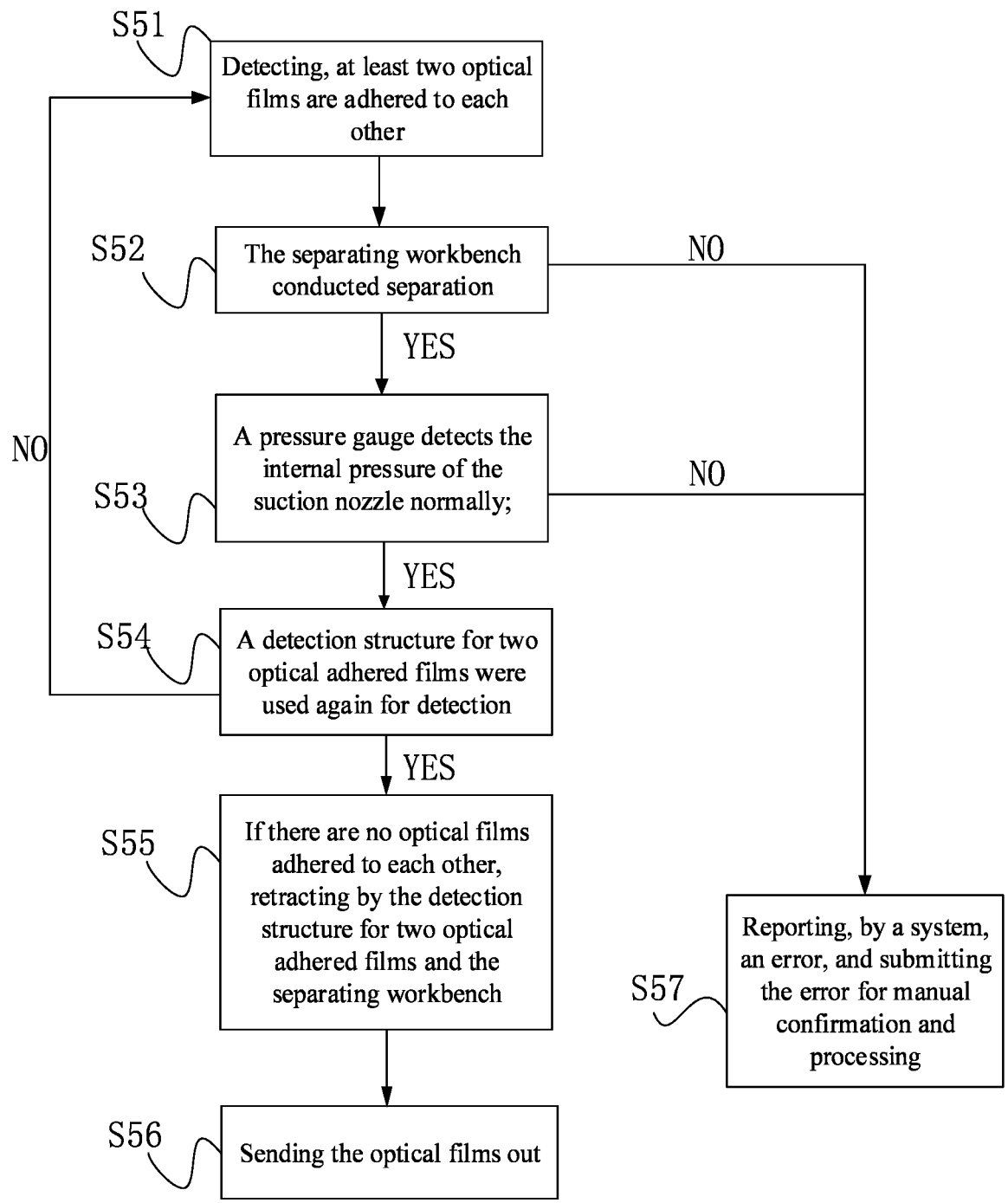
FIG. 5 is a schematic diagram of a flow of completely separating optical adhered films according to an embodiment of this application.

In one or more embodiments of this application, referring to FIG. 5, the separating the optical adhered films by using a separating workbench 1 includes:

S51: detecting, at least two optical films are adhered to each other;

S52: the separating workbench are successfully separated;

S53: and a pressure gauge detects the internal pressure of the suction nozzle normally;

S54: a detection structure for two optical adhered films were used again for detection.

S55; if there are no optical films adhered to each other, retracting by the detection structure for two optical adhered films and the separating workbench; and S56: sending the optical films out.

In this embodiment, it may be prevented that there are a plurality of optical films adhered to each other but only one optical film is separated and the optical film is transported.

In one or more embodiments, the separating the optical adhered films by using a separating workbench 1 includes:

S51: detecting, at least two optical films are adhered to each other;

S52: the separating workbench conducted separation;

S53: if the optical adhered films are unsuccessfully separated or a pressure of the suction nozzle is detected to be abnormal; and S57: reporting, by a system, an error, and submitting the error for manual confirmation and processing.

In this implementation, a failure may be prevented from occurring in the separating workbench and causing separation to be performed in cycle but the separation to be unsuccessful.

It should be understood that the definition to respective steps related in this solution cannot be deemed as definition to the sequence of the steps without influencing implementation of the specific embodiment. Steps presented in the previous can be executed previously or posteriorly or even simultaneously, and as long as this solution can be implemented, it shall fall within the protection scope of the present application.

The technical solution of this application can be widely applied to various display panels, such as a twisted nematic (TN) display panel, an in-plane switching (IPS) display panel, a vertical alignment (VA) display panel, and a multi-domain vertical alignment (MVA) display panel, or other types of display panels such as an organic light-emitting diode (OLED) display panel, which are all applied to the foregoing solution.

The foregoing content further describes the present invention in detail with reference to specific exemplary embodiments, and the specification should not be construed as a limitation on the specific embodiments of this application. Persons of ordinary skill in the art can further make simple deductions or replacements without departing from the concept of this application, and such deductions or replacements should all be considered as falling within the protection scope of this application.

What is claimed is:

1. A device for separating adhered optical films, comprising:
   a separating workbench configured to separate optical films that are adhered together;
   a plurality of suction nozzles configured to adsorb the optical films that are adhered together; and
   a driver configured to drive the plurality of suction nozzles and the separating workbench, wherein
   the plurality of suction nozzles comprises a first group of suction nozzles and a second group of suction nozzles, wherein the first group of suction nozzles and the second group of suction nozzles are arranged opposite to each other;
   wherein the first group of suction nozzles is used to suck one outer surface of the optical films that are stuck together, and the second group of suction nozzles is used to suck another outer surface of the optical films that are stuck together, and wherein the driver is configured to drive the first group of suction nozzles and the second group of suction nozzles to move away from each other to pull the optical films that are stuck together towards opposite sides so that the optical films stuck together are gradually separated from each other until they are pulled apart to be completely separated from each other;
   the separating workbench comprises a fixed table and a base, wherein the fixed table is fixedly arranged on the base, the first group of suction nozzles is arranged on the driver, and the second group of suction nozzles is arranged on the fixed table; and
   wherein the separating workbench further comprises:
   a first clamping plate, wherein one end of the first clamping plate is connected to the first group of suction nozzles, and the other end thereof is connected to the driver; and
   a second clamping plate, wherein one end of the second clamping plate is connected to the second group of suction nozzles, and the other end thereof is connected to the fixed table;
   the first clamping plate and the second clamping plate are arranged in parallel, and the plurality of suction nozzles protrude from working surfaces of the first clamping plate and the second clamping plate, respectively;
   wherein each of the plurality of suction nozzles comprises a clamping plate end, wherein the clamping plate end is embedded in a fixing end of the suction nozzle, and is connected to the respective first clamping plate or second clamping plate;
   wherein the driver comprises a sub-driver configured to drive the separating workbench to move along one direction, wherein the separating workbench is arranged on the sub-driver; and
   wherein the device for separating adhered optical films further comprises a detector for two adhered optical films configured to detect a number of the adhered optical films, wherein the detector for two adhered optical films is connected to the separating workbench; wherein in response to the detector detecting a presence of at least two adhered optical films that are stuck together, the sub-driver is used to drive the separating workbench to separate the at least two adhered optical films from each other;
   wherein the fixed table comprises two legs that are perpendicular to each other, wherein the second clamping piece is disposed at a free end of one of the two legs facing away from a junction of the two legs.

2. A device for separating adhered optical films, comprising:
   a separating workbench configured to separate optical films that are stuck together;
   a plurality of suction nozzles configured to adsorb the optical films that are stuck together; and a driver configured to drive the plurality of suction nozzles and the separating workbench, wherein the plurality of suction nozzles comprises a first group of suction nozzles and a second group of suction nozzles, wherein the first group of suction nozzles and the second group of suction nozzles are arranged opposite to each other;

wherein the first group of suction nozzles is used to suck one outer surface of the optical films that are stuck together, and the second group of suction nozzles is used to suck another outer surface of the optical films that are stuck together, and wherein the driver is configured to drive the first group of suction nozzles and the second group of suction nozzles to move away from each other to pull the optical films that are stuck together towards opposite sides so that the optical films stuck together are gradually separated from each other until they are pulled apart to be completely separated from each other;

wherein the separating workbench comprises a fixed table and a base, wherein the fixed table is fixedly arranged on the base, the first group of suction nozzles is arranged on the driver, and the second group of suction nozzles is arranged on the fixed table;

wherein the separating workbench further comprises: a first clamping plate, wherein one end of the first clamping plate is connected to the first group of suction nozzles, and the other end thereof is connected to the driver; and a second clamping plate, wherein one end of the second clamping plate is connected to the second group of suction nozzles, and the other end thereof is connected to the fixed table; and wherein the first clamping plate and the second clamping plate are arranged in parallel, wherein the first group of suction nozzles protrudes from a working surface of the first clamping plate, and the second group of suction nozzles protrudes from a working surface of the second clamping plate.

3. The device for separating adhered optical films according to claim 2, wherein the first group of suction nozzles and the second group of suction nozzles each have one nozzle, wherein the two nozzles are respectively arranged on the first clamping plate and the second clamping plate and are arranged opposite to each other, openings of the two suction nozzles being located between the first clamping plate and the second clamping plate.

4. The device for separating adhered optical films according to claim 3, wherein the first clamping plate and the second clamping plate are arranged horizontally.

5. The device for separating adhered optical films according to claim 4, wherein a shape of the suction nozzle is a circle, and centers of circles of the two suction nozzles are located on a same vertical line.

6. The device for separating adhered optical films according to claim 2, wherein the suction nozzle comprises a clamping plate end, wherein the clamping plate end is embedded in a fixing end of the suction nozzle and connected to the first clamping plate or the second clamping plate.

7. The device for separating adhered optical films according to claim 2, wherein the driver comprises a sub-driver configured to drive the separating workbench to move along a first direction, wherein the separating workbench is arranged on the sub-driver.

8. The device for separating adhered optical films according to claim 2, wherein the separating device comprises a detector for two adhered optical films, wherein the detector for two adhered optical films is connected to the separating workbench.

9. The device for separating adhered optical films according to claim 2, wherein each of the plurality of suction nozzles is operative to absorb the adhered optical films by vacuumizing.

10. The device for separating adhered optical films according to claim 2, wherein the driver is a pneumatic driver.

11. The device for separating adhered optical films according to claim 2, wherein a material of the separating workbench is aluminum.

12. The device for separating adhered optical films according to claim 2, wherein the device for separating adhered optical films further comprises a pressure gauge to detect a pressure value of the device for separating adhered optical films during operation.

13. The device for separating adhered optical films according to claim 2, wherein the fixed table comprises two legs that are perpendicular to each other, wherein the second clamping piece is disposed at a free end of one of the two legs facing away from a junction of the two legs.

14. The device for separating adhered optical films according to claim 2, wherein the first group of suction nozzles is used to suck one outer surface of the optical films that are stuck together, and the second group of suction nozzles is used to suck another outer surface of the optical films that are stuck together, and wherein the driver is configured to drive the first group of suction nozzles and the second group of suction nozzles to move away from each other to pull the optical films that are stuck together towards opposite sides so that the optical films stuck together are gradually separated from each other until they are pulled apart to be completely separated from each other.

15. A method for separating adhered optical films using a device for separating adhered optical films, the device comprising: a separating workbench configured to separate optical films that are adhered together; a plurality of suction nozzles configured to adsorb the optical films that are adhered together; and a driver configured to drive the plurality of suction nozzles and the separating workbench; wherein the plurality of suction nozzles comprises a first group of suction nozzles and a second group of suction nozzles, wherein the first group of suction nozzles and the second group of suction nozzles are arranged opposite to each other; wherein the first group of suction nozzles is used to suck one outer surface of the optical films that are stuck together, and the second group of suction nozzles is used to suck another outer surface of the optical films that are stuck together, and wherein the driver is configured to drive the first group of suction nozzles and the second group of suction nozzles to move away from each other to pull the optical films that are stuck together towards opposite sides so that the optical films stuck together are gradually separated from each other until they are pulled apart to be completely separated from each other; wherein the separating workbench comprises a fixed table and a base, wherein the fixed table is fixedly arranged on the base, the first group of suction nozzles is arranged on the driver, and the second group of suction nozzles is arranged on the fixed table; and wherein the separating workbench further comprise a first clamping plate, wherein one end of the first clamping plate is connected to the first group of suction nozzles, and the other end thereof is connected to the driver; and a second clamping plate, wherein one end of the second clamping plate is connected to the second group of suction nozzles, and the other end thereof is connected to the fixed table; the first clamping plate and the second clamping plate are arranged in parallel, and the plurality of suction nozzles protrude from working surfaces of the first clamping plate and the second clamping plate, respectively; wherein each of the plurality of suction nozzles comprises a clamping plate end, wherein the clamping plate end is embedded in a fixing end of the suction nozzle, and is connected to the respective first clamping plate or second clamping plate; wherein the driver comprises a sub-driver configured to drive the separating workbench to move along one direction, wherein the separating workbench is arranged on the sub-driver; and wherein the device for separating adhered optical films further comprises a detector for two adhered optical films configured to detect a number of the adhered optical films, wherein the detector for two adhered optical films is connected to the separating workbench:

wherein the method for separating adhered optical films comprising the following steps:

detecting, by the detector for two adhered optical films, whether there are at least two optical films that are adhered to each other;

in response to detecting that there are at least two optical films that are adhered to each other, using the separating workbench to separate the adhered optical films from each other; and in response to detecting that there aren't at least two optical films that are adhered to each other, performing no work by the separating workbench.

16. The method for separating adhered optical films according to claim 15, wherein the using the separating workbench to separate the adhered optical films from each other comprises:

if the adhered optical films are successfully separated and a pressure of the suction nozzle is detected to be normal, detecting a number of the optical films again; and if there are no optical films adhered to each other, retracting by the detector for two adhered optical films and the separating workbench; and sending the optical films out.

17. The method for separating adhered optical films according to claim 15, wherein the using the separating workbench to separate the adhered optical films from each other comprises:

if the adhered optical films are unsuccessfully separated or a pressure of the suction nozzle is detected to be abnormal; and reporting an error, and submitting the error for manual confirmation and processing.

18. The method for separating adhered optical films according to claim 15, wherein the method for separating adhered optical films comprises:

adsorbing, by the first group of suction nozzles and the second group of suction nozzles, two outer surfaces of the adhered optical films; and driving, by the driver, the first group of suction nozzles and the second group of suction nozzles to pull the adhered optical films toward two sides to separate the adhered optical films from each other.

* * * * *